United States Patent Office 3,415,769
Patented Dec. 10, 1968

3,415,769
ETHYLENE-α-OLEFIN ELASTOMER COMPOSITIONS
David M. Todd, Warrington, and William D. McDavid, Pensacola, Fla., assignors to Tenneco Chemicals, Inc., a corporation of Delaware
No Drawing. Filed May 24, 1965, Ser. No. 458,460
15 Claims. (Cl. 260—29.8)

ABSTRACT OF THE DISCLOSURE

Oligomers of cyclic monoterpene hydrocarbons, which have the formula $(C_{10}H_{16})_n$ wherein $n$ is an integer in the range of 2 to 4 and which have boiling points in the range of 170° C. to 240° C. at 10 mm. can be used to tackify and at the same time to soften and plasticize elastomeric ethylene-α-olefin polymers. These oligomers do not adversely affect the rate at which the elastomer compositions cure or the physical properties of the compositions; they are resistant to oxidation and are not readily extracted from the compositions by solvents or by alkalies.

---

This invention relates to ethylene-α-olefin elastomer compositions and to processes for their production. More particularly, it relates to compositions of this nature that contain oligomers of cyclic monoterpene hydrocarbons as the plasticizer-tackifier.

Rubbery, substantially amorphous ethylene-α-olefin polymers have become of increasing commercial interest with the introduction of low pressure processes for their manufacture. These polymers, however, like other synthetic rubbers, lack natural tack, and they require the addition of tackifiers as well as plasticizers before they can be used in elastomer compositions.

A number of materials have been suggested for use as plasticizers or tackifiers for ethylene-α-olefin polymers, but none of them when used individually or in combination have imparted the desired combination of properties to the elastomer compositions. One combination of additives that has been widely used includes petroleum hydrocarbon oils as plasticizer and a liquid thermoplastic phenol-aldehyde resin as tackifier. The use of this combination of additives is not entirely satisfactory for many applications because the phenol-aldehyde resin interferes with the cure rate of both peroxide-cured ethylene-α-olefin copolymers and sulfur-cured ethylene-α-olefine-diene terpolymers and tends to have a deleterious effect on the physical properties of the elastomer compositions. In addition the phenol-aldehyde resins are alkali-extractable and are susceptible to oxidation.

In accordance with the present invention, it has been found that oligomers of cyclic monoterpene hydrocarbons can be used to tackify and at the same time to soften and plasticize ethylene-α-olefin polymers. The use of the oligomers does not adversely affect the rate at which the elastomer compositions cure or the physical properties of the compositions. The oligomers are resistant to oxidation and are not readily extracted from the compositions by solvents or by alkalies.

The oligomers of cyclic monoterpene hydrocarbons that may be used in the compositions of this invention are low molecular weight polymers of such cyclic monoterpene hydrocarbons as dipentene, limonene, α-pinene, β-pinene, p-cymene, carenes, camphene, and mixtures thereof. These oligomeres have the formula $(C_{10}H_{16})_n$, wherein $n$ represents an integer in the range of 2 to 8. Particularly advantageous results have been obtained with ethylene-propylene-diene terpolymers that contained as plasticizer-tackifier oligomers that were dimers or mixtures of dimers and trimers containing small amounts of tetramers and that were obtained by the polymerization of dipentene or turpentine. These preferred oligomers have boiling points in the range of 170° C. to 240° C. at 10 mm. pressure and molecular weights in the range of 270 to 450.

The terpene oligomers may be prepared by any suitable and convenient procedure. For example, they may be prepared by the thermal or catalytic polymerization of the appropriate terpene or mixtures of terpenes. In a preferred method for the preparation of the oligomers turpentine is polymerized in the presence of a Lewis acid catalyst and a hydrocarbon solvent. After distillation to remove the solvent, the polymer contains approximately 5% to 15% by weight of terpene monomers (principally α-pinene and β-pinene), 50% to 90% by weight of terpene oligomers, and 5% to 40% by weight of higher polymers. While this material can be used without purification in the ethylene-α-olefin elastomer compositions of this invention, it is preferably distilled to separate the oligomers from the monomers and from at least a part of the higher polymers. Compositions having excellent combinations of physical properties have been obtained when the terpene oligomers used as plasticizer-tackifier contained as much as 15 percent of higher polymers.

Any of the elastomeric ethylene-α-olefin polymers can be used in the practice of this invention. These include a wide variety of normally-solid, rubbery ethylene-α-olefin copolymers and ethylene-α-olefin-diene terpolymers. These polymers which are known in the art can be prepared by polymerizing ethylene with an α-olefin or with an α-olefin and a diene by any of several methods. The preparation of these polymers is described, for example, in Belgian Patents No. 535,082, No. 538,782, No. 553,655, and No. 583,039 and in U.S. Patents No. 2,700,663, No. 2,726,231, No. 3,102,876, No. 3,153,023, and No. 3,154,528.

The α-olefins that can be polymerized with ethylene to form these copolymers and terpolymers are those that contain from 3 to 8, and preferably 3 to 6, carbon atoms per molecule with no branching closer to the double bond than the 4-position, for example, propylene, 1-butene, 1-pentene, 1-hexene, 1-octene, 4-methyl-1-pentene, 5-methyl-1-hexene, and the like. Both conjugated and non-conjugated linear and cyclic hydrocarbon dienes may be polymerized with ethylene and one or more of the aforementioned α-olefins to form the elastomeric terpolymers. These include 1,3-butadiene, isoprene, 1,3-pentadiene, 1,4-hexadiene, dicyclopentadiene, 5-methylene-2-norbornene, 5-(2'-ethyl-2'-butenyl)-2-norbornene, 2-ethyl-2,5-norbornadiene, and the like.

The following are specific examples of the elastomeric polymers that may be used in the compositions of this invention: ethylene-propylene; ethylene-1-butene; ethylene-1-hexene; ethylene-propylene-1,3-butadiene; ethylene-propylene-isoprene; ethylene-propylene-dicyclopentadiene; ethylene-propylene-5-methyl-2-norbornene; ethylene-1-butene-1,3-butadiene; ethylene-1-hexene-isoprene; ethylene-1-hexene-1,4-hexadiene; and the like. The preferred polymers are the ethylene-propylene-diene terpolymers which contain approximately 25 percent to 75 percent by weight of ethylene monomer units, 25 percent to 75 percent by weight of propylene monomer units, and 0.5 percent to 5 percent by weight of diene monomer units and which have iodine numbers below approximately 30.

The ethylene-α-olefin polymers may be used as such in the novel elastomer compositions, or they may be extended with approximately 50 percent to 200 percent, and preferably 100 percent, based on the weight of the polymer, of a paraffinic, aromatic, or naphthenic oil prior to their use.

The amount of terpene oligomers that is incorporated in the ethylene-α-olefin elastomer compositions is that which will impart the desired properties to the compositions. It is largely dependent upon the choice of polymer and oligomers and upon the properties desired in the elastomer composition. In most cases, approximately 1 percent to 35 percent by weight, based on the weight of the polymer, is used. Excellent results have been obtained when 10 percent to 20 percent by weight, based on the weight of the polymer, of terpene oligomers was incorporated in an ethylene-propylene-diene composition.

The ethylene-α-olefin elastomer composition may, if desired, contain other softeners and plasticizers in addition to the terpene oligomers. For example, compositions having excellent combinations of properties have been prepared which contained as the softener-plasticizer component 10 percent to 20 percent by weight, based on the weight of the polymer, of terpene oligomers and 20 percent to 50 percent by weight, base on the weight of the polymer, of a naphthenic, paraffinic, or aromatic petroleum oil.

The elastomer compositions of this invention may also contain fillers, dyes, extenders, stabilizers, accelerators, vulcanizing agents, and the like in the amounts ordinarily employed for these purposes.

Various methods may be employed for incorporating the terpene oligomers into the elastomer compositions. One suitable method is to compound the ethylene-α-olefin polymer with the terpene oligomers and other ingredients on a two-roll rubber mill or a Banbury mixer at an elevated temperature until complete dispersion is attained. Vulcanization of the compositions is readily effected by subjecting the elastomer composition which contains a vulcanizing agent to temperatures of 250° F. to 450° F., and preferably 300° F. to 350° F., for from 1 minute to 120 minutes, and preferably 10 minutes to 60 minutes.

The invention is further illustrated by the examples that follow. In these examples all parts and percentages are parts by weight and percentages by weight unless otherwise specified.

Example 1

One hundred parts of an ethylene-propylene-diene terpolymer (Royalene 200) was compounded on a rubber mill with rolls set at 70° F. with 1 part of stearic acid, 50 parts of High Abrasion Furnace Black, 0.5 part of zinc oxide, 0.5 part of mercaptobenzothiazole (Captax), 1.5 parts of tetramethylthiuram monosulfide (Monex), 1.5 parts of sulfur, variable amounts of plasticizers and tackifiers, and variable amounts of terpene oligomers. The compounded stocks were press cured at 320° F. and 500 p.s.i., half for 15 minutes and half for 45 minutes. The properties of the compositions were determined by the following procedures:

Compatibility.—Blooming of ingredients at the surface of uncured stocks after one week at room temperature was taken as an indication of incompatibility.

Tack.—Tack was estimated by pulling apart by hand two sheets of uncured stock that had been pressed together.

Plasticity.—Mooney viscosity was measured on uncured stocks for four minutes at 212° F. using a large rotor.

Modulus of elasticity, tensile strength and elongation at break.—These properties were measured directly or derived from data obtained by pulling cured stocks on a Scott L-6 Tester.

Hardness.—Hardness was measured on cured stocks using a Shore A2 Durometer.

The properties of the compositions are given in Table I. For comparative purposes, the properties of compositions containing other types of plasticizers and tackifiers are included in this table.

The data in Table I demonstrate that the compositions that contained terpene oligomers alone (Ex. No. 1A–1C) or in combination with other plasticizers (Ex. 1D, 1G–1J and 1M–1R) cured more rapidly to form products that had a better combination of physical properties than did the products containing another plasticizer or plasticizer-tackifier combination (Ex. No. 1F, 1K, 1L, and 1S–1V).

Example 2

One hundred parts of an ethylene-propylene-diene terpolymer extended with 100 percent of a naphthenic oil (Royalene X400) was compounded on a rubber mill with rolls set at 70° F. with 0.5 part of stearic acid, 100 parts of Semi-reinforcing Gas Furnace Black, 2.5 parts of zinc oxide, 0.25 part of mercaptobenzothiazole (Captax), 0.75 part of tetramethylthiuram monosulfide (Monex), 0.75 part of sulfur, and 10 parts of terpene oligomer or a comparative plasticizer and/or tackifier. The compounded stocks were press cured at 320° F. and 500 p.s.i., half for 10 minutes and half for 45 minutes.

The plasticity, modulus of elasticity, tensile strength, elongation, and hardness of the compositions were determined by the procedures described in Example 1. Tack TABLE I—Continued

| Ex. No. | Terpene Oligomer | PHR¹ | Other Plasticizers or Tackifiers | PHR¹ | Compatibility | Tack | Plasticity (Uncured Stock) | Modulus of Elasticity 15 Min. | Modulus of Elasticity 45 Min. | Tensile Strength 15 Min. | Tensile Strength 45 Min. | Elongation at Break 15 Min. | Elongation at Break 45 Min. | Hardness 15 Min. | Hardness 45 Min. |
|---|---|---|---|---|---|---|---|---|---|---|---|---|---|---|---|
| 1T | do | | Thermoplastic phenol-aldehyde resin (Bakelite CRR0909) | 10 | | | | | | | | | | | |
| | do | | Naphthenic Oil (Necton 60) Thermoplastic phenol-aldehyde resin (Bakelite CRR0707) | 40 | do | Poor | 34 | 400 | 760 | 1,470 | 2,200 | 670 | 580 | 57 | 60 |
| 1U | do | | Naphthenic Oil (Necton 60) Thermoplastic phenol-aldehyde resin (Durez 22800) | 40 10 | Good | Good | 39 | 500 | 850 | 2,770 | 2,580 | 760 | 560 | 54 | 57 |
| 1V | do | | Naphthenic Oil (Necton 60) Pentene-pentadiene dimer | 40 10 | do | Fair | 39 | 310 | 450 | 2,010 | 2,480 | 830 | 750 | 52 | 53 |

¹ PHR=Parts of additive per 100 parts of ethylene-α-olefin polymer.

TABLE II

| Ex. No. | Plasticizer-Tackifier | Tack (Lbs. Pull Required) | Plasticity (Uncured Stock) | Modulus of Elasticity 10 Min. | Modulus of Elasticity 45 Min. | Tensile Strength 10 Min. | Tensile Strength 45 Min. | Elongation at Break 10 Min. | Elongation at Break 45 Min. | Shore Hardness 10 Min. | Shore Hardness 45 Min. |
|---|---|---|---|---|---|---|---|---|---|---|---|
| 2A | Dipentene dimer | 2.5 | 39 | 710 | 1,140 | 1,090 | 1,500 | 680 | 510 | 56 | 60 |
| 2B | Dipentene dimer-trimer-tetramer | 2.5 | 45 | 780 | 1,210 | 1,110 | 1,510 | 630 | 460 | 57 | 62 |
| 2C | do | 2.6 | 43 | 790 | 1,260 | 1,150 | 1,540 | 610 | 460 | 57 | 62 |
| 2D | Dipentene tetramer-pentamer | 2.2 | 47 | 800 | 1,240 | 1,150 | 1,560 | 600 | 530 | 58 | 62 |
| 2E | None | 1.5 | 63 | 1,050 | 1,700 | 1,440 | 1,870 | 600 | 360 | 63 | 68 |
| 2F | Thermoplastic phenol-aldehyde resin (Bakelite CRR-0909) | 2.8 | 45 | 710 | 1,090 | 1,190 | 1,510 | 760 | 530 | 58 | 62 |
| 2G | Thermoplastic phenol-aldehyde resin (Durez 22890) | 2.7 | 41 | 750 | 1,170 | 1,220 | 1,510 | 730 | 500 | 55 | 59 |
| 2H | Pentene-pentadiene heptamer | 2.5 | 44 | 680 | 990 | 1,040 | 1,300 | 660 | 580 | 56 | 59 |
| 2I | Pentene-pentadiene dimer | 2.4 | 41 | 500 | 760 | 800 | 1,160 | 550 | 640 | 54 | 56 |

Example 3

One hundred parts of an ethylene-propylene-diene terpolymer extended with 100 percent of a naphthenic oil (Royalene X400) was compounded in a Banbury mill with 1 part of stearic acid, 60 parts of High Abrasion Furnace Black, 5 parts of zinc oxide, 0.5 part of mercaptobenzothiazole (Captax), 0.5 part of tetramethylthiuram monosulfide (Monex), 1.5 parts of sulfur, and 20 parts of turpentine oligomers or a comparative plasticizer. The oligomers used were obtained by polymerizing turpentine at 40° C. in the presence of aluminum chloride and distilling the product to obtain fractions of turpentine dimers containing varying amounts of higher polymers (trimers-pentamers).

The compounded stocks were press cured at 320° F. and 500 p.s.i., half for 15 minutes and half for 45 minutes. The plasticity, modulus of elasticity, elongation, and hardness of the compositions were determined by the procedures described in Example 1. Cure Index is the time in minutes required for the Mooney viscosity to rise 30 points above the scorch point. The properties of the compositions are given in Table III.

was determined by the following procedure: Each stock was remilled to provide fresh surfaces, formed into a sheet, placed on a flat surface, and cooled to room temperature. Strips 1″ x 4″ were die-cut from the sheets and placed face to face in three pairs. The paired strips were placed between steel plates and loaded with a 24-pound weight for 3 minutes. Each pair of strips was then separated using a modified Scott L-6 Tester. The average pull required to separate the three pairs of strips is recorded in Table II.

The properties of the elastomer compositions are given in Table II.

TABLE III

| Ex. No. | Plasticizer | Plasticity (Uncured Stock) | Mooney Cure Index at 280° F. | Physical Data for Cured Stock at 10 Min., 30 Min. and 45 Min. Cure Times | | | | | | | | | | | |
|---|---|---|---|---|---|---|---|---|---|---|---|---|---|---|---|
| | | | | Modulus of Elasticity | | | Tensile Strength | | | Elongation at Break | | | Shore A2 Hardness | | |
| | | | | 15 Min. | 30 Min. | 45 Min. | 15 Min. | 30 Min. | 45 Min. | 15 Min. | 30 Min. | 45 Min. | 15 Min. | 30 Min. | 45 Min. |
| 3A | Turpentine dimers containing no higher polymers | 27 | 5.2 | 630 | 810 | 880 | 2,080 | 2,240 | 2,270 | 690 | 600 | 590 | 53 | 55 | 56 |
| 3B | Turpentine dimers containing 3.5% higher polymers | 28 | 4.8 | 610 | 800 | 850 | 2,040 | 2,240 | 2,120 | 690 | 620 | 570 | 52 | 54 | 54 |
| 3C | Turpentine dimers containing 11% higher polymers | 27 | 4.7 | 580 | 800 | 860 | 2,040 | 2,210 | 2,150 | 710 | 620 | 570 | 53 | 55 | 55 |
| 3D | Paraffin oil (Mobilsol 55) | 26 | 6.9 | 750 | 1,010 | 1,150 | 2,100 | 2,090 | 2,190 | 630 | 510 | 480 | 52 | 55 | 57 |
| 3E | Naphthenic oil (Necton 60) | 27 | 6.7 | 760 | 1,010 | 1,170 | 2,160 | 2,190 | 2,160 | 640 | 530 | 470 | 53 | 56 | 58 |
| 3F | None | 52 | 5.4 | 1,440 | 1,870 | 2,120 | 2,650 | 2,660 | 2,640 | 510 | 410 | 380 | 63 | 66 | 67 |

From the data in Tables I, II, and III, it will be seen that the terpene oligomers, whether used alone or in combination with other processing agents, are effective as combined softener-plasticizers and tackifiers for ethylene-α-olefin elastomer compositions. The oligomers are compatible with both oil-extended and non-extended polymers, and they soften the polymers and render them tacky without adversely affecting their cure rate or their physical properties.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A composition comprising an elastomeric terpolymer containing approximately 25% to 75% by weight of ethylene monomer units, 25% to 75% by weight of propylene monomer units, and 0.5% to 5% by weight of units of monomers selected from the group consisting of 1,3-butadiene, isoprene, 1,3-pentadiene, 1,4-hexadiene, dicyclopentadiene, 5-methylene-2-norbornene, 5-(2'-ethyl-2'-butenyl)-2-norbornene, and 2-ethyl-2,5-norbornadiene and approximately 1 percent to 35 percent by weight, based on the weight of said terpolymer, of oligomers of cyclic monoterpene hydrocarbons, said oligomers having the formula $(C_{10}H_{16})_n$, where $n$ represents an integer in the range of 2 to 4, and having boiling points in the range of 170° to 240° C. at 10 mm. pressure.

2. A composition as set forth in claim 1 which contains 10 percent to 20 percent by weight, based on the weight of said terpolymer, of said terpene oligomers.

3. A composition as set forth in claim 1 which contains 10 percent to 20 percent by weight, based on the weight of said terpolymer, of dipentene oligomers.

4. A composition as set forth in claim 1 which contains 10 percent to 20 percent by weight, based on the weight of said terpolymers, of pinene oligomers.

5. A composition comprising an elastomeric terpolymer containing approximately 25% to 75% by weight of ethylene units, 25% to 75% by weight of propylene units, and 0.5% to 5% by weight of units of a monomer selected from the group consisting of 1,3-butadiene, isoprene, 1,3-pentadiene, 1,4-hexadiene, dicyclopentadiene, 5-methylene-2-norbornene, 5-(2'-ethyl-2'-butenyl) - 2-norbornene, and 2-ethyl-2,5-norbornadiene, and as plasticizer-tackifier (a) 10 percent to 20 percent by weight, based on the weight of said terpolymer of oligomers of cyclic monoterpene hydrocarbons, said oligomers having the formula $(C_{10}H_{16})_n$, wherein $n$ represents an integer in the range of 2 to 4 and having boiling points in the range of 170° C. to 240° C. at 10 mm. pressure, and (b) 20 percent to 50 percent, based on the weight of said terpolymer, of a petroleum oil selected from the group consisting of naphthenic, paraffinic, and aromatic oils.

6. The composition of claim 5 wherein the oligomers are dipentene oligomers.

7. The composition of claim 5 wherein the oligomers are pinene oligomers.

8. The composition of claim 5 wherein the petroleum oil is a naphthenic oil.

9. The process of plasticizing and tackifying an elastomeric terpolymer containing approximately 25% to 75% by weight of ethylene units, 25% to 75% by weight of propylene units, and 0.5% to 5% by weight of units of a monomer selected from the group consisting of 1,3-butadiene, isoprene, 1,3-pentadiene, 1,4-hexadiene, dicyclopentadiene, 5-methylene-2-norbornene, 5-(2'-ethyl-2'-butenyl) - 2 - norbornene, and 2-ethyl-2,5-norbornadiene which comprises incorporating in said terpolymer approximately 1% to 35%, based on the weight of the terpolymer, of oligomers of cyclic monoterpene hydrocarbons, said oligomers having the formula $(C_{10}H_{16})_n$, wherein $n$ represents an integer in the range of 2 to 4, and having boiling points in the range of 170° C. to 240° C. at 10 mm. pressure.

10. The process of claim 9 wherein 10 percent to 20 percent, based on the weight of the terpolymer, of dipentene oligomers is incorporated into the terpolymer.

11. The process of claim 9 wherein 10 percent to 20 percent, based on the weight of said terpolymer, of pinene oligomers is incorporated into the terpolymer.

12. The process of claim 9 wherein (a) 10 percent to 20 percent, based on the weight of said terpolymer, of oligomers of cyclic monoterpene hydrocarbons, said oligomers having the formula $(C_{10}H_{16})_n$, wherein $n$ represents an integer in the range of 2 to 4 and (b) 20 percent to 50 percent, based on the weight of said terpolymer, of a petroleum oil selected from the group consisting of ntphthenic, paraffinic, and aromatic oils is incorporated into the terpolymer.

13. The process of claim 12 wherein the oligomers are dipentene oligomers.

14. The process of claim 12 wherein the oligomers are pinene oligomers.

15. The process of claim 12 wherein the petroleum oil is a naphthenic oil.

References Cited

UNITED STATES PATENTS

| | | | |
|---|---|---|---|
| 3,175,986 | 3/1965 | Apikos | 260—27 |
| 2,741,651 | 4/1956 | Been | 260—27 |
| 2,409,276 | 10/1946 | Harvey | 260—29.8 |
| 3,025,167 | 3/1962 | Butler | 260—28.5 |
| 3,171,824 | 3/1965 | Young. | |

FOREIGN PATENTS 676,351  12/1963  Canada.

OTHER REFERENCES

Alliger, Vulcanization of Elastomers, 1964, Reinhold Pub. Co., pages 316 and 317.

Mzourek, Plaste and Kautsche, vol. 7, 1960, pages 396–398.

Condensed Chemical Dictionary, 6th edition, pages 894, 404, 1961.

Du Pont, Nordel, April 1964; pages 25 and 26.

MORRIS LIEBMAN, *Primary Examiner.*

S. L. FOX, *Assistant Examiner.*

U.S. Cl. X.R.

260—33.6